(12) United States Patent
Cho et al.

(10) Patent No.: US 9,049,536 B2
(45) Date of Patent: *Jun. 2, 2015

(54) METHOD FOR ALLOCATING RESOURCES IN BROADBAND WIRELESS ACCESS SYSTEM

(75) Inventors: Heejeong Cho, Anyang-si (KR); Giwon Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 504 days.

This patent is subject to a terminal disclaimer.

(21) Appl. No.: 13/457,012

(22) Filed: Apr. 26, 2012

(65) Prior Publication Data

US 2013/0090144 A1 Apr. 11, 2013

Related U.S. Application Data

(60) Provisional application No. 61/545,199, filed on Oct. 10, 2011, provisional application No. 61/546,563, filed on Oct. 13, 2011, provisional application No. 61/577,090, filed on Dec. 19, 2011.

(51) Int. Cl.
| | |
|---|---|
| *H04B 17/00* | (2006.01) |
| *H04W 4/00* | (2009.01) |
| *H04W 4/20* | (2009.01) |
| *H04W 52/02* | (2009.01) |

(52) U.S. Cl.
CPC .............. *H04W 4/005* (2013.01); *H04W 4/20* (2013.01); *H04W 52/0235* (2013.01)

(58) Field of Classification Search
CPC .... H04W 76/021; H04W 72/04; H04W 84/12
USPC ............................ 455/509; 370/328, 338, 242
See application file for complete search history.

(56) References Cited

U.S. PATENT DOCUMENTS

| | | | | |
|---|---|---|---|---|
| 7,480,261 B2* | 1/2009 | Speight | .......................... | 370/280 |
| 7,509,128 B2* | 3/2009 | Choi et al. | .................... | 455/450 |
| 2011/0051697 A1 | 3/2011 | Wang et al. | | |
| 2011/0265158 A1* | 10/2011 | Cha et al. | ........................... | 726/6 |
| 2013/0070674 A1* | 3/2013 | Lin et al. | ........................ | 370/328 |
| 2013/0155954 A1* | 6/2013 | Wang et al. | .................... | 370/328 |
| 2013/0315074 A1* | 11/2013 | Kim et al. | ..................... | 370/242 |
| 2014/0056193 A1* | 2/2014 | Huang et al. | ................... | 370/311 |

FOREIGN PATENT DOCUMENTS

WO WO 2010/101447 A2 9/2010

OTHER PUBLICATIONS

IEEE: "WirelessMAN_Advanced Air Interface for Broadband Wireless Access Systems, Enhancements to Support Machine-to-Machine Applications", Oct. 1, 2011, pp. 1-63, XP055054111, IEEE P802.16p.

* cited by examiner

*Primary Examiner* — Andrew Wendell
*Assistant Examiner* — Maryam Soltanzadeh
(74) *Attorney, Agent, or Firm* — McKenna Long & Aldridge LLP

(57) ABSTRACT

A method and apparatus for efficiently allocating resources to a terminal in a random access system are provided. A method for transmitting an abnormal power down report from a Machine to Machine (M2M) device in a wireless communication system may include transmitting the abnormal power down report to a base station using uplink resources that have already been allocated to the M2M device and starting a first timer for confirmation of the transmitted abnormal power down report.

16 Claims, 5 Drawing Sheets

| Name | Length (bit) | Description |
|---|---|---|
| CID | 16 | M2M device's basic connection identifier. |
| Emergency Type | 1 | 0b0: power outage<br>0b1: *Reserved* |
| *Reserved* | 17 | Set to 0 |
| HCS | 8 | Header Check Sequence (same usage as HCS entry in Table 5). |

METHOD FOR ALLOCATING RESOURCES IN BROADBAND WIRELESS ACCESS SYSTEM

This application claims the benefit of U.S. Patent Application No. 61/545,199, filed on Oct. 10, 2011, Application No. 61/546,563, filed on Oct. 13, 2011, and Application No. 61/577,090, filed on Dec. 19, 2011, which are hereby incorporated by reference as if fully set forth herein.

BACKGROUND OF THE INVENTION

1. Field of the Invention

The present invention relates to a broadband wireless access system, and more particularly, to a method and apparatus for efficiently allocating resources to a terminal in a random access system.

2. Discussion of the Related Art

Although conventional communication is mostly Human to Human (H2H) communication performed between terminals of users via a base station, Machine to Machine (M2M) communication has become possible along with development of communication technology. The term "M2M communication" refers to communication that is performed between electronic terminals as the term states. Although, in a broad sense, the term "M2M communication" refers to wired or wireless communication between electronic terminals or communication between a terminal that is controlled by a human and a machine, the term has generally been used recently to indicate wireless communication between electronic terminals, i.e., wireless communication between terminals.

In the early 1990's when the M2M communication concept was introduced, M2M was considered a concept such as remote control or telematics and associated markets were greatly limited. However, in recent years, M2M communication has been continuously rapidly developed, creating a new market that is attracting domestic and global attention. Especially, M2M communication has exerted a great influence upon fields such as Point Of Sale (POS) and fleet management in the security-related application market and a smart meter for automatically measuring the amount of consumed heat or electricity, measuring an operating time of construction equipment and facilities, and remote monitoring machines and facilities. In the future, M2M communication will be used for a wider variety of purposes, in combination with existing mobile communication and wireless high-speed Internet or low-power communication solutions such as Wi-Fi and Zig-Bee, and will no longer be limited to the B2B market and will expand its application field into a B2C market.

In the M2M communication era, all machines equipped with a SIM card can transmit and receive data such that it is possible to remotely manage and control all such machines. For example, the field of application of M2M communication technology is very broad such that M2M communication technology can be used for a great number of terminals and equipment such as cars, trucks, trains, containers, vending machines, and gas tanks.

SUMMARY OF THE INVENTION

Accordingly, the present invention is directed to a method for efficiently allocating resources in a broadband wireless access system that substantially obviates one or more problems due to limitations and disadvantages of the related art.

An object of the present invention is to provide a more efficient random access method and an apparatus for the same.

Another object of the present invention is to provide a method for efficiently determining a result of a random access attempt of a terminal.

Objects of the present invention are not limited to those described above and other objects will be clearly understood by those skilled in the art from the following description.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting an abnormal power down report from a Machine to Machine (M2M) device in a wireless communication system may include transmitting the abnormal power down report to a base station using uplink resources that have already been allocated to the M2M device, and starting a first timer for confirmation of the transmitted abnormal power down report.

The method may further include receiving a first confirmation signal from the base station in response to the transmitted abnormal power down report, and stopping the first timer in response to the received first confirmation signal.

The method may further include retransmitting the abnormal power down report to the base station when the M2M device has not received a first confirmation signal in response to the transmitted abnormal power down report from the base station before the first timer expires.

Here, the abnormal power down report may include at least one of identifier (CID) information identifying the M2M device and information indicating an emergency type of the abnormal power down.

In another aspect of the present invention, a method for transmitting an abnormal power down report from a Machine to Machine (M2M) device in a wireless communication system may include transmitting a bandwidth request (BR) to a base station, receiving allocation of uplink resources from the base station in response to the transmitted BR, transmitting the abnormal power down report to the base station using the received uplink resources, and starting a first timer for confirmation of the transmitted abnormal power down report.

The method may further include receiving a first confirmation signal from the base station in response to the transmitted abnormal power down report, and stopping the first timer in response to the received first confirmation signal.

The method may further include retransmitting the abnormal power down report to the base station when the M2M device has not received a first confirmation signal in response to the transmitted abnormal power down report from the base station before the first timer expires.

Here, the abnormal power down report may include at least one of identifier (CID) information identifying the M2M device and information indicating an emergency type of the abnormal power down.

In another aspect of the present invention, a Machine to Machine (M2M) device for transmitting an abnormal power down report in a wireless communication system may include a transmission module for transmitting the abnormal power down report to a base station using uplink resources that have already been allocated to the M2M device, and a processor for starting a first timer for confirmation of the transmitted abnormal power down report.

The M2M device may further include a reception module for receiving a first confirmation signal from the base station in response to the transmitted abnormal power down report, wherein the processor may perform a control operation to stop the first timer in response to the received first confirmation signal.

The M2M device may further include a reception module for receiving a first confirmation signal in response to the transmitted abnormal power down report from the base station, wherein the processor may perform a control operation to retransmit the abnormal power down report to the base station when the first confirmation signal is not received from the base station before the first timer expires.

Here, the abnormal power down report may include at least one of identifier (CID) information identifying the M2M device and information indicating an emergency type of the abnormal power down.

In another aspect of the present invention, a Machine to Machine (M2M) device for transmitting an abnormal power down report in a wireless communication system may include a transmission module for transmitting a bandwidth request (BR) to a base station, a reception module for receiving uplink resources from the base station in response to the transmitted BR, and a processor for performing a control operation to transmit the abnormal power down report to the base station using the received uplink resources and a control operation to start a first timer for confirmation of the transmitted abnormal power down report.

The reception module may receive a first confirmation signal from the base station in response to the transmitted abnormal power down report and the processor may perform a control operation to stop the first timer in response to the received first confirmation signal.

In addition, the reception module may receive a first confirmation signal in response to the transmitted abnormal power down report and the processor may perform a control operation to retransmit the abnormal power down report to the base station when the first confirmation signal is not received from the base station before the first timer expires.

Here, the abnormal power down report may include at least one of identifier (CID) information identifying the M2M device and information indicating an emergency type of the abnormal power down.

Embodiments of the present invention have the following advantages.

According to the embodiments of the present invention, a terminal (M2M device) can efficiently transmit an abnormal power down report to a base station using uplink resources that have already been allocated to the terminal.

In addition, according to the embodiments of the present invention, the terminal can perform efficient communication using a timer for confirmation of the transmitted abnormal power down report.

Advantages of the present invention are not limited to those described above and other advantages will be clearly understood by those skilled in the art from the following description.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
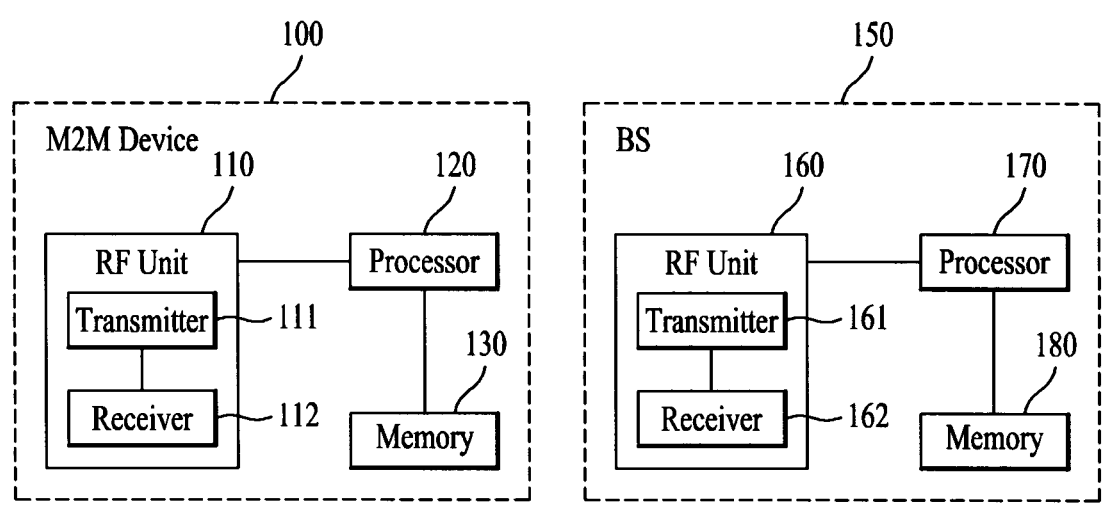
FIG. 1 schematically illustrates configurations of an M2M device and a base station according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The embodiments described below are provided by combining components and features of the present invention in specific forms. The components or features of the present invention may be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment.

In this specification, the embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node of the BS as needed.

That is, it will be apparent to those skilled in the art that the BS or any other network node may perform various operations for communication with terminals in a network including a number of network nodes including BSs. The term "Base Station (BS)" may be replaced with another term such as "fixed station", "Node B", "eNode B (eNB)", "Access Point (AP)", or "Advanced BS (ABS)". The term "terminal" may also be replaced with another term such as "User Equipment (UE)", "Mobile Station (MS)", "Mobile Subscriber Station (MSS)", "Advanced MS (AMS)", or "Subscriber Station (SS)".

The embodiments of the present invention may be implemented by various means. For example, the embodiments of the present invention may be implemented by hardware, firmware, software, or any combination thereof.

In the case in which the present invention is implemented by hardware, a method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, a method according to the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents. Especially, the embodiments of the present invention can be supported by at least one of P802.16-2004, P802.16e-2005, P802.16Rev2, and IEEE P802.16m which are standard documents of the IEEE 802.16 system.

Specific terms used in the following description are provided for better understanding of the present invention and can be replaced with other terms without departing from the spirit of the present invention.

In a wireless communication system, a terminal (or user equipment) can receive information through downlink from a base station and can transmit information through uplink. Information transmitted or received by the user equipment includes data and various control information and various physical channels are provided according to the type or usage of the information transmitted or received by the user equipment.

Such a terminal that communicates in an M2M manner as described above can be referred to as an M2M device, an M2M communication terminal, or a Machine Type Communication (MTC) terminal. On the other hand, a conventional terminal (or user equipment) may be referred to as a Human Type Communication (HTC) terminal or a Human to Human (H2H) terminal.

The number of M2M devices in a network will gradually increase as the number of machine application types increases. Such machine application types that are under discussion include, but are not limited to, (1) security, (2) public safety, (3) tracking and tracing, (4) payment, (5) healthcare, (6) remote maintenance and control, (7) metering, (8) consumer devices, (9) Point Of Sale (POS) and fleet management in the security-related application market, (10) communication between vending machines, (11) a smart meter for automatically measuring the amount of consumed heat or electricity, measuring an operating time of construction equipment and facilities, and remote monitoring machines and facilities, and (12) surveillance video communication of a surveillance camera, and various other machine application types are also under discussion. As the number of machine application types increases, the number of M2M devices will significantly increase compared to the number of conventional devices, i.e., H2H devices.

Another feature of the M2M device is low mobility such that the M2M device almost does not move once it is installed. That is, the M2M device may remain stationary for a long time. The system can simplify or optimize mobility-related operations for specific M2M applications having fixed positions such as applications for secured access and surveillance, public safety, payment, remote maintenance and control, and metering.

As the number of device application types increases, the number of M2M communication devices may significantly increase compared to the number of general mobile communication devices. In the case in which all M2M communication devices individually perform communication with a BS, such communication may impose serious load on a wireless interface and/or a network.

Embodiments of the present invention are described below with reference to the case in which M2M communication is applied to a wireless communication system (for example, a P802.16e, P802.16m, P802.16.1b, or P802.16p system) as an example. However, the present invention is not limited to such systems and may also be applied to a different communication system such as a 3GPP LTE/LTE-A system.

FIG. 1 schematically illustrates configurations of an M2M device and a base station according to an embodiment of the present invention.

As shown in FIG. 1, the M2M device 100 and the base station 150 may include Radio Frequency (RF) units 110 and 160, and processors 120 and 170, respectively, and may optionally include memories 130 and 180, respectively. Although FIG. 1 shows the configurations of one M2M device and one BS, an M2M communication environment may be implemented between a plurality of M2M devices and a BS.

The RF units 110 and 160 may include transmitters 111 and 161 and receivers 112 and 162, respectively. The transmitter 111 and the receiver 112 of the M2M device 100 may be configured so as to transmit and receive signals to and from the base station 150 and other M2M devices and the processor 120 may be functionally connected to the transmitter 111 and the receiver 112 so as to control processes which the transmitter 111 and the receiver 112 perform to transmit and receive signals to and from other devices. The processor 120 may transmit a signal to the transmitter 111 after performing a variety of processes upon the signal and may process a signal received by the receiver 112.

When needed, the processor 120 may store information included in an exchanged message in the memory 130. Using such a structure, the M2M device 100 can perform methods according to various embodiments described below.

Although not illustrated in FIG. 1, the M2M device 100 may include various additional components according to the device application type of the M2M device. For example, when the M2M device 100 is an M2M device for smart measurement, the M2M device 100 may include an additional component for power measurement or the like and such a power measurement operation may be controlled by the processor 120 shown in FIG. 1 or by a separate processor (not shown).

Although FIG. 1 illustrates, as an example, the case in which communication is performed between the M2M device 100 and the base station 150, M2M communication methods according to the present invention may be performed between M2M devices and each of the devices may have the same configuration as that shown in FIG. 1 and perform methods according to various embodiments described below.

The transmitter 161 and the receiver 162 of the base station 150 may be configured so as to transmit and receive signals to and from another base station, an M2M server, and M2M devices and the processor 170 may be functionally connected to the transmitter 161 and the receiver 162 so as to control processes which the transmitter 161 and the receiver 162 perform to transmit and receive signals to and from other devices. The processor 170 may transmit a signal to the transmitter 161 after performing a variety of processes upon the signal and may process a signal received by the receiver 162. When needed, the processor 170 may store information included in an exchanged message in the memory 180. Using such a structure, the base station 150 can perform methods according to various embodiments described above.

The processors 120 and 170 of the RF unit 110 and the base station 150 instruct (for example, control, adjust, or manage) operations of the RF unit 110 and the base station 150, respectively. The processors 120 and 170 may be connected to the memories 130 and 180 that store program code and data. The memories 130 and 180 are connected to the processors 120 and 170 and store operating systems, applications, and general files, respectively.

Each of the processors 120 and 170 of the present invention may also be referred to as a controller, a microcontroller, a microprocessor, or a microcomputer. Each of the processors 120 and 170 may be implemented by hardware, firmware, software, or any combination thereof. In the case in which the embodiments of the present invention are implemented by hardware, the processors 120 and 170 may include application specific integrated circuits (ASICs), digital signal processors (DSPs), digital signal processing devices (DSPDs), programmable logic devices (PLDs), field programmable gate arrays (FPGAs), processors, controllers, microprocessors, or the like.

In the case in which the embodiments of the present invention are implemented by firmware or software, the firmware or software may be configured so as to include modules, processes, functions, or the like which perform the features or operations of the present invention and the firmware or software configured so as to implement the present invention may be provided in the processors 120 and 170 or may be stored in the memories 130 and 180 so as to be executed by the processors 120 and 170.

The following is a description of a random access uplink resource request procedure that an M2M device performs to request random access uplink resources from a broadband wireless access system.

First, a terminal transmits a Bandwidth Request (BR) ranging code to a BS.

When the BS has received the BR ranging code transmitted from the terminal, the BS allocates uplink resources for bandwidth request (BW-REQ) message transmission to the terminal.

The terminal transmits a BW-REQ message (in the form of a header) including information regarding resources requested by the terminal through the allocated resources.

When the BS has received the BW-REQ message transmitted from the terminal, the BS allocates uplink resources to the terminal.

Thus, the terminal can transmit data to the BS through the allocated uplink resources.

Figure 2:
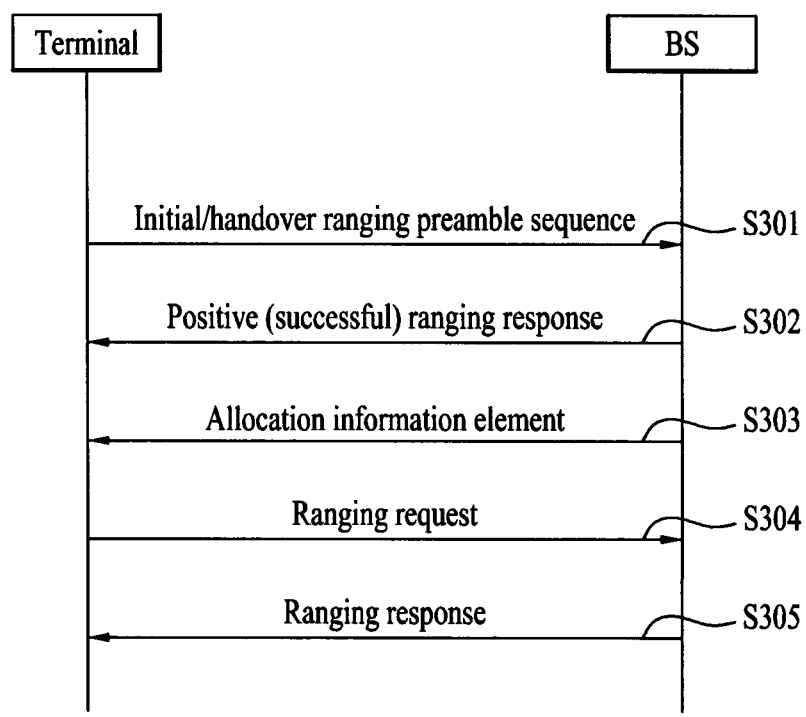
FIG. 2 illustrates an exemplary initial/handover ranging procedure that may be performed in a general IEEE 802.16 system.

FIG. 2 illustrates an exemplary initial/handover ranging procedure that may be performed in a general IEEE 802.16 system.

As shown in FIG. 2, first, a terminal transmits a ranging preamble code for initial/handover ranging to a BS (S301).

The BS may transmit a ranging response (RNG-RSP) message including the reception state of a ranging preamble code transmitted by each terminal and a physical adjustment value (such as timing, power, or frequency) to the terminal (S302).

When the BS has properly received the ranging preamble code, the BS allocates, to each terminal, uplink resources required for the terminal to transmit a ranging request (RNG-REQ) message (S303).

The terminal transmits an RNG-REQ to the BS through the allocated uplink resources (S304).

The BS transmits a ranging response (RNG-RSP) message to the terminal as a response to the RNG-REQ message transmitted by the terminal (S305).

Figure 3:
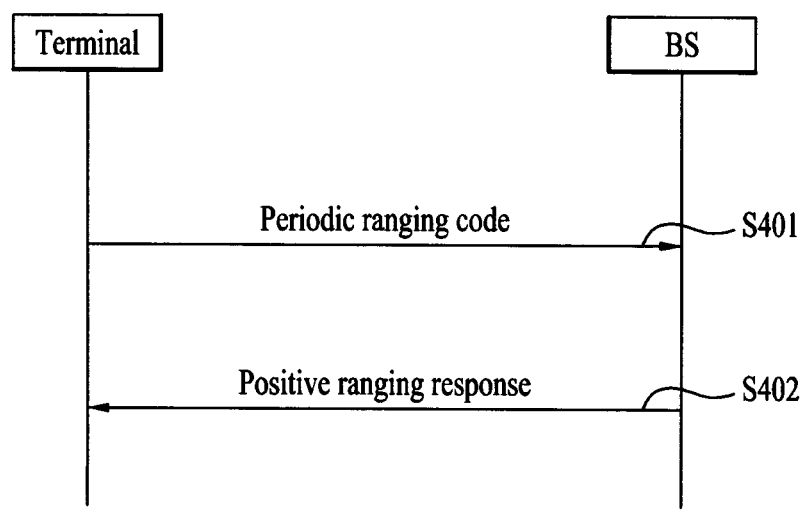
FIG. 3 illustrates an exemplary periodic ranging procedure that may be performed in a general IEEE 802.16 system.

FIG. 3 illustrates an exemplary periodic ranging procedure that may be performed in a general IEEE 802.16 system.

As shown in FIG. 3, a terminal transmits a ranging preamble code for periodic ranging to a BS (S401).

The BS may transmit a ranging response (RNG-ACK) message including the reception state of a ranging preamble code transmitted by each terminal and a physical adjustment value (such as timing, power, or frequency) to the terminal (S402).

The term "abnormal power down" refers to a phenomenon in which power is reduced abnormally or involuntarily. When such abnormal power down has occurred in an M2M device, the M2M device transmits an abnormal power down report to the BS.

When the M2M device has detected that abnormal power down has occurred, the M2M device may transmit an RNG-REQ and a ranging purpose indication which indicates that abnormal or involuntary power down has occurred. Here, the terms "ranging purpose indication" and "RNG-REQ" may be used interchangeably with "M2M abnormal power down report header".

If an uplink bandwidth that has been allocated to the M2M device in a normal mode is valid, the M2M device may transmit the M2M abnormal power down report header using the allocated uplink bandwidth.

If the M2M device has no uplink bandwidth that has been allocated to the M2M device in a normal mode, the M2M device requests an uplink bandwidth to the BS through the uplink resource request procedure described above. When the M2M device has received allocation of an uplink bandwidth in response to the uplink bandwidth request, the M2M device transmits an M2M abnormal power down report header to the BS using the allocated bandwidth.

Figure 4:
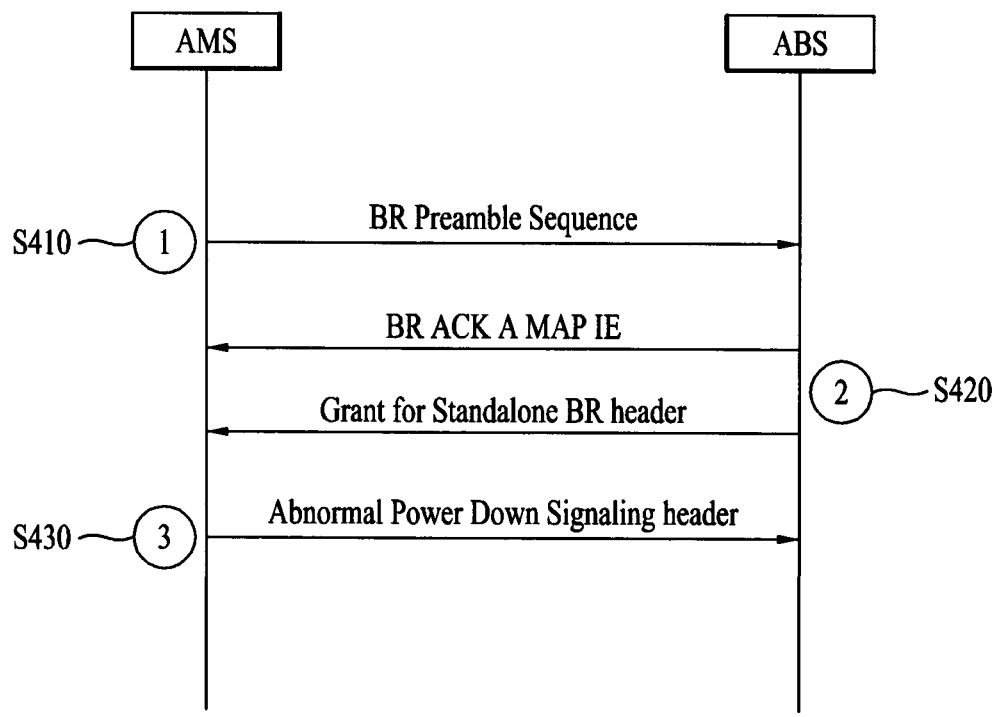
FIG. 4 illustrates an example in which a terminal transmits an abnormal power down report to a BS in association with the present invention.

FIG. 4 illustrates an example in which a terminal transmits an abnormal power down report to a BS in association with the present invention.

In embodiments of the present invention, an M2M device may transmit an abnormal power down report to a base station (BS) by transmitting a signaling header in a connected state. Although only one M2M device (denoted by "AMS" in FIG. 4) is illustrated in FIG. 4 for ease of explanation, two or more M2M devices may perform communication with the BS (denoted by "ABS" in FIG. 4).

Referring to FIG. 4, it is assumed that the M2M device and the BS are transmitting and receiving data in a connected state and abrupt power outage has occurred in the M2M device.

In this case, the M2M device transmits a Bandwidth Request (BR) preamble sequence to the BS in order to request a bandwidth for transmitting a signaling header (S410).

Upon receiving the BR preamble sequence, the BS allocates wireless resources to the M2M device. Thereafter, the BS may transmit resource allocation information associated with the allocated wireless resources to the M2M device (S420).

Upon receiving the resource allocation information, the M2M device may transmit a signaling header including an abnormal power down report to the BS (S430).

Upon receiving the signaling header including the power outage indication, the BS may transmit a corresponding response message to the M2M device. Here, an acknowledgement (ACK) message may be used as the response message. Alternatively, the BS may transmit an M2M abnormal power-off check header as a response message to the M2M device to instruct the M2M device to perform a power-off operation.

When the M2M device has transmitted the signaling header including the abnormal power down report to the BS, the M2M device may immediately perform a power-off operation or may perform a power-off operation after receiving an ACK message from the BS.

Figures 5, 6:
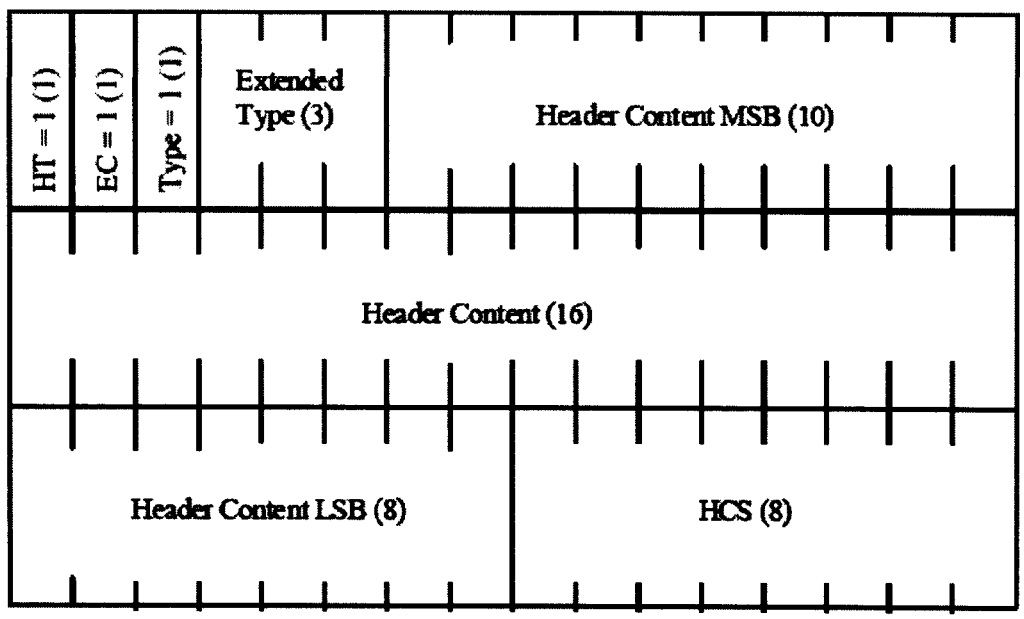
FIG. 5 illustrates an exemplary signaling header including an abnormal power down report that is transmitted to a BS.
FIG. 6 illustrates an exemplary signaling header that is transmitted using a conventional extended signaling header type.

FIG. 5 illustrates an exemplary signaling header format that may be used in step 5430.

As shown in FIG. 5, the signaling header format may include CID information identifying the M2M device, emergency type information indicating the type of abnormal power down, HCS information indicating a header check sequence, and the like.

On the other hand, there may a need to provide a method for checking whether or not the BS has received the abnormal power down report transmitted by the M2M device.

That is, since the M2M device may perform a power-off operation upon receiving an ACK message from the BS after transmitting a signaling header including an abnormal power down report, it is important for the terminal (M2M device) to check whether or not the BS has received the abnormal power down report.

Further, there may be need to provide a method in which, when a predetermined requirement is satisfied, the M2M device determines that the transmitted abnormal power down report has not been received by the BS and retransmits an abnormal power down report to the BS.

Accordingly, in the present invention, the M2M device may start a timer for awaiting reception of a confirmation signal indicating whether or not an abnormal power down report has been received by the BS after transmitting the abnormal power down report to the BS.

Here, the timer may be newly defined or may be replaced with a T3 timer.

The following is a detailed description of the timer that can be applied to the present invention.

The timer may be replaced with a T3 timer shown in the following Table 1 which is applied to the present invention.

TABLE 1

| System | Name | Time reference | Minimum value | Default value | Maximum value |
|---|---|---|---|---|---|
| SS, MS | T3 | Ranging response reception time out following the transmission of a ranging request | | OFDMA: xx msec: RNG-RSP after RNG-REQ for abnormal power down report | 200 ms |

In addition, the timer applied to the present invention may be newly defined as shown in the following Table 2.

TABLE 2

| System | Name | Time reference | Minimum value | Default value | Maximum value |
|---|---|---|---|---|---|
| ... | ... | | | | |
| M2M device | Abnormal power Down Confirmation timer | Abnormal Power down confirmation reception timeout following the transmission of an abnormal power down report | — | 50 msec | — |

A method, in which the M2M device starts a timer for awaiting reception of a confirmation signal indicating whether or not an abnormal power down report has been received by the BS after transmitting the abnormal power down report to the BS, is described in detail below with reference to the timer described above.

The BS, which has received the abnormal power down report, may determine that the M2M device will experience abnormal power down.

Thereafter, the BS may notify the M2M device that the abnormal power down report has been correctly received.

In order to notify the BS that the BS has properly received the abnormal power down report from the M2M device, the BS may transmit a MAC management message (for example, an abnormal power down report confirmation or an RNG-RSP) or a confirmation header indicating that the abnormal power down report has been received to the M2M device. The BS may also transmit other information including such information to the M2M device.

When the M2M device has received a confirmation signal before the timer for awaiting reception of the confirmation signal expires, the M2M device determines that the abnormal power down report transmitted by the M2M device has been correctly received by the BS. Accordingly, the M2M device stops the timer and then terminates the abnormal power down report procedure.

However, when the timer for awaiting reception of the confirmation signal has expired, the M2M device again performs the abnormal power down report procedure.

Accordingly, the M2M device may easily determine whether or not the BS has received the abnormal power down report using an event of receiving a confirmation signal from the BS or an event of expiration of the timer.

The following is a more detailed description of a signaling header format including the confirmation signal of the BS described above or the abnormal power down report that may be applied to the present invention.

How to use a conventional extended signaling header type is described below with reference to FIG. 6.

First, a reserved value of 5 in the conventional extended signaling header type may indicate a MAC header type which may be used to indicate an abnormal power down report or confirmation.

An extension method may also be used for the reserved value 5. In this case, in the conventional extended signaling header type, extended type II should be present subsequent to the extended type.

That is, extended type II may be present next to the extended type as shown in FIG. 6.

The type and/or content of the header may vary depending on the extended type II.

The type of the header may be defined as shown in the following Table 3 depending on the extended type II. This is merely an example and the present invention is not limited to this example.

TABLE 3

| Extended type II | type |
|---|---|
| 0 | abnormal Power down report |
| 1 | abnormal Power down report confirmation |
| 2-15 | Reserved |

In addition, since the conventional extended signaling header type includes headers for a relay station, the headers are transmitted through resources dedicated to the relay station.

Accordingly, since the M2M device does not use resources dedicated to the relay station, the type may be reused for the abnormal power down report or for transmission of the confirmation signal by the BS as shown in the following Table 4.

TABLE 4

| Type field | MAC header type (with HT/EC = 0b11) | Reference figure | Reference table |
|---|---|---|---|
| 0 | Feedback header, with another 4-bit type field; see Table 18 for its type encodings. | FIG. 33, FIG. 34 | Table 17 |
| 1 | Extended relay MAC Signaling Header Type II | FIG. 37 | Table 20 |
|  | Extended M2M device MAC Signaling Header Type II |  | Table 22a |

The type of the MAC header may be represented according to the value of the extended type field as shown in the following Table 5. Content of the following Table 5 is merely an example of the present invention and the present invention is not limited to this example.

TABLE 5

| Extended Type field | MAC header type |
|---|---|
| 0 | M2M abnormal power down report header When an M2M device in connected state detects an abnormal power down event, it sends an M2M abnormal power down report signaling header indicating that an abnormal or involuntary power down has occurred. |
| 1~7 | Reserved |

In one method of using the conventional extended signaling header type, it is possible to use the format of FIG. 5 described above.

Since a DL signaling header has not been defined in the related art, it is possible to apply a method in which a newly defined type is used.

A detailed type may be represented as shown in the following Table 6. Content of table 6 is merely an example of the present invention and it is apparent that a table in a different format may be applied.

TABLE 6

| HT | $EC^a$ | MAC PDU type |
|---|---|---|
| 1 | 0 | DL: DL M2M MAC signaling header type I. MAC PDU without data payload, with a 3-bit type field, see Table 8a for type encoding definitions. UL: MAC signaling header type I. MAC PDU without data payload, with a 3-bit type field, see Table 8 for type encoding definitions. |

A downlink (DL) MAC header having no payload format may be applied only to downlink. The MAC header need not be followed by a MAC PDU payload and a CRC.

Downlink (DL) M2M MAC signaling header type I is described with reference to Table 7.

For such a MAC header format, no payload may be carried in the MAC header. Table 7 represents an encoding format of a 3-bit type field according to an EC field.

TABLE 7

| Type field (3 bits) | MAC header type (with HT/EC = 0b10) |
|---|---|
| 0 | M2M abnormal power down confirmation header An M2M abnormal power down confirmation signaling header shall be transmitted by the BS in response to a received abnormal power down report. |
| 1~7 | Reserved |

It is possible to apply another method in which a newly defined type is used. This may be represented by Table 8.

TABLE 8

| Name | Length (bit) | Description |
|---|---|---|
| Type | 3 | The type of M2M abnormal power down confirmation header |
| Reserved | 35 | Set to 0. |
| HCS | 8 | Header Check Sequence (same usage as HCS entry in Table 5). |

In another method, a MAC management message format may be used.

That is, a basic MAC management message may include a field indicating confirmation of reception of an abnormal power down report, an identifier of a terminal that has transmitted the abnormal power down report (for example, a MAC address or a CID), and the like.

In the abnormal power down reporting procedure, the terminal (M2M device) may not have power enough to receive a response message from the BS which indicates reception of the report. That is, a situation in which power of the M2M device is insufficient may occur.

Thus, according to another embodiment of the present invention, the terminal may not start the timer according to transmission of the abnormal power down report. Here, the abnormal power down report may be transmitted in a signaling header format or a conventional MAC management message format.

For example, in the case in which an abnormal power down report is transmitted through an RNG-REQ message, conventionally, the T3 timer is always started when the RNG-REQ message is transmitted. However, the terminal may not start the T3 timer since a power shortage situation may occur as described above.

As is apparent from the above description, according to the embodiments of the present invention, a terminal (M2M device) can efficiently transmit an abnormal power down report to a base station using uplink resources that have already been allocated to the terminal.

In addition, according to the embodiments of the present invention, the terminal can perform efficient communication using a timer for confirmation of the transmitted abnormal power down report.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention.

The method for allocating resources in a broadband wireless access system may be used in various wireless communication systems such as 3GPP LTE-A and IEEE 802.

What is claimed is:

1. A method for transmitting an abnormal power down report at a Machine to Machine (M2M) device in a wireless communication system, the method comprising:
   transmitting the abnormal power down report to a base station using uplink resources that have already been allocated to the M2M device;
   starting a first timer to wait for a confirmation signal of the transmitted abnormal power down report; and
   retransmitting the abnormal power down report to the base station when the M2M device does not receive the confirmation signal in response to the transmitted abnormal power down report from the base station before the first timer expires.

2. The method according to claim 1, further comprising:
   receiving the confirmation signal from the base station in response to the transmitted abnormal power down report; and
   stopping the first timer in response to the receiving of the confirmation signal.

3. The method according to claim 1, wherein the abnormal power down report includes at least one of identifier (CID) information related to the M2M device and information indicating an emergency type of the abnormal power down.

4. A method for transmitting an abnormal power down report at a Machine to Machine (M2M) device in a wireless communication system, the method comprising:
   transmitting a bandwidth request (BR) to a base station;
   receiving allocation information of uplink resources from the base station in response to the transmitted BR;
   transmitting the abnormal power down report to the base station using the received uplink resources;
   starting a first timer to wait for a confirmation signal of the transmitted abnormal power down report; and
   retransmitting the abnormal power down report to the base station when the M2M device does not receive the confirmation signal in response to the transmitted abnormal power down report from the base station before the first timer expires.

5. The method according to claim 4, further comprising:
   receiving the confirmation signal from the base station in response to the transmitted abnormal power down report; and
   stopping the first timer in response to the receiving of the confirmation signal.

6. The method according to claim 4, wherein the abnormal power down report includes at least one of identifier (CID) information related to the M2M device and information indicating an emergency type of the abnormal power down.

7. A Machine to Machine (M2M) device configured to transmit an abnormal power down report in a wireless communication system, the M2M device comprising:
   a transmission module configured to transmit the abnormal power down report to a base station using uplink resources that have already been allocated to the M2M device; and
   a processor configured to start a first timer to wait for a confirmation signal of the transmitted abnormal power down report,
   wherein the processor is further configured to perform a control operation to retransmit the abnormal power down report to the base station when the M2M device does not receive the confirmation signal in response to the transmitted abnormal power down report from the base station before the first timer expires.

8. The M2M device according to claim 7, further comprising a reception module configured to receive the confirmation signal from the base station in response to the transmitted abnormal power down report,
   wherein the processor is further configured to stop the first timer in response to the receiving of the confirmation signal.

9. The M2M device according to claim 7, wherein the abnormal power down report includes at least one of identifier (CID) information related to the M2M device and information indicating an emergency type of the abnormal power down.

10. A Machine to Machine (M2M) device configured to transmit an abnormal power down report in a wireless communication system, the M2M device comprising:
    a transmission module configured to transmit a bandwidth request (BR) to a base station;
    a reception module configured to receive allocation information of uplink resources from the base station in response to the transmitted BR; and
    a processor configured to perform a control operation to transmit the abnormal power down report to the base station using the received uplink resources and start a first timer to wait for a confirmation signal of the transmitted abnormal power down report,
    wherein the processor is further configured to perform a control operation to retransmit the abnormal power down report to the base station when the M2M device does not receive the confirmation signal in response to the transmitted abnormal power down report from the base station before the first timer expires.

11. The M2M device according to claim 10, wherein the reception module is further configured to receive the confirmation signal from the base station in response to the transmitted abnormal power down report and the processor is further configured to stop the first timer in response to the receiving of the confirmation signal.

12. The M2M device according to claim 10, wherein the abnormal power down report includes at least one of identifier (CID) information related to the M2M device and information indicating an emergency type of the abnormal power down.

13. The method according to claim 1, wherein the confirmation signal indicates whether or not the transmitted abnormal power down report has been received by the base station.

14. The method according to claim 4, wherein the confirmation signal indicates whether or not the transmitted abnormal power down report has been received by the base station.

15. The M2M device according to claim 7, wherein the confirmation signal indicates whether or not the transmitted abnormal power down report has been received by the base station.

16. The m2m device according to claim 10, wherein the confirmation signal indicates whether or not the transmitted abnormal power down report has been received by the base station.

* * * * *